United States Patent
Olsson et al.

(10) Patent No.: US 8,259,677 B2
(45) Date of Patent: Sep. 4, 2012

(54) METHOD AND SYSTEM FOR INTRA E-UTRAN HANDOVER

(75) Inventors: Lars-Bertil Olsson, Angered (SE); Anders Åhlén, Göteborg (SE); Roland Gustafsson, Myggenäs (SE); Hans-Olof Sundell, Kalvsund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 292 days.

(21) Appl. No.: 12/525,706

(22) PCT Filed: Feb. 6, 2007

(86) PCT No.: PCT/SE2007/050072
§ 371 (c)(1),
(2), (4) Date: Nov. 4, 2009

(87) PCT Pub. No.: WO2008/097147
PCT Pub. Date: Aug. 14, 2008

(65) Prior Publication Data
US 2010/0232391 A1  Sep. 16, 2010

(51) Int. Cl.
*H04W 4/00* (2009.01)
(52) U.S. Cl. .................. 370/331; 370/328; 370/329
(58) Field of Classification Search .................. None
See application file for complete search history.

(56) References Cited

U.S. PATENT DOCUMENTS
2007/0213060 A1 * 9/2007 Shaheen ............... 455/436

OTHER PUBLICATIONS

Shaheen, Kamel, U.S. Appl. No. 60/792,935, "Method and Apparatus for supporting handoff in a long term evolution GPRS tunneling protocol-based system".*
Motorola, Qualcomm, Lucent: "Tunnel movement signalling between eNS and UPE" Motorola, 3GPP TSG SA WG2 Architecture—SAE Ad-Hoc, Nov. 14-17, 2006, S2-0643052, retrieved from http://www.3gpp.org/ftp/Specs/html-info/TDocExMtg- -S2-ah26145--26145.htm.

* cited by examiner

*Primary Examiner* — Faruk Hamza
*Assistant Examiner* — Diane Lo
(74) *Attorney, Agent, or Firm* — Roger S. Burleigh

(57) ABSTRACT

The invention regards a handover method for a data packet based wireless mobile communications network. The network comprises a core network (CN) and a radio area network (RAN). The core network (CN) comprises a control plane node (MME) intercommunicating with a user plane node (UPE). The radio area network comprises a mobile user equipment (UE) intercommunicating with a source radio base transceiver station, eNOdeB, (source eNodeB), wherein payload data is routed via a tunnel between the user plane node (UPE) and the source eNodeB (source eNodeB), wherein the handover comprises the step of establishing a temporary tunnel between the user plane node (UPE) and a target eNodeB (target eNodeB), the handover being initiated by the target eNodeB (target eNodeB) transmitting an unreliable uplink data signal to the user plane node (UPE) comprising handover information.

7 Claims, 4 Drawing Sheets

METHOD AND SYSTEM FOR INTRA E-UTRAN HANDOVER

TECHNICAL FIELD

The invention refers to a handover method for a data packet based wireless mobile communications network and a system arranged to handle such a method. The network comprises a core network, CN, and a radio area network, RAN. The core network, CN, comprises a control plane node, MME, intercommunicating with a user plane node, UPE. The radio area network comprises a mobile user equipment, UE, intercommunicating with an expanded source radio base transceiver station, source eNodeB. Payload data between the user equipment UE and the core network, CN, in the form of uplink, UL, data and downlink, DL, data is routed via a tunnel between the user plane node, UPE, and the source eNodeB.

BACKGROUND

3GPP LTE (Long Term Evolution) is the name given to a project within the Third Generation Partnership Program to improve the Universal Mobile Telecommunications System (hereinafter called UMTS) mobile phone standard to cope with future requirements. Some goals for the LTE project is to get improved efficiency, lower costs, improve services, make use of new spectrum opportunities, and better integration with other open standards. The LTE includes mostly or wholly extensions and modifications of the UMTS system.

As part of the new 3GPP (3GPP TS 36.300 v0.3.1 regarding contents in 3GPP TR 23.882 v1.6.1) architecture of the wireless radio network, the logic provided by a Radio Network Controller (hereinafter called RNC) in legacy of UMTS Terrestrial Radio Access Network (hereinafter called UTRAN) has been distributed to the enhanced radio base station (hereinafter called eNodeB) and the functional entities of the core network, CN. One functional entity is a Mobility Management Entity (hereinafter called MME or control plane node) which is a control plane node arranged to handle reliable control signaling from the eNodeB to another functional entity being a User Plane Entity (hereinafter called UPE or user plane node). The UPE is a user plane node handling unreliable signaling comprising payload data from the eNodeB to the UPE.

Traditionally NodeB is a term used in UMTS to denote the BTS (base transceiver station) controlling a cell in a cellular network. In contrast with GSM base stations, Node B uses WCDMA as air transport technology. As in all cellular systems, such as UMTS and GSM, Node B contains radio frequency transmitter(s) and the receiver(s) used to communicate directly with the mobiles, which move freely around it. In this type of cellular networks the mobiles cannot communicate directly with each other but have to communicate with the BTSs.

The eNodeB is an expanded NodeB arranged to handle wireless data communication that uses Orthogonal Frequency Division Multiple Access OFDMA as air transport technology. The OFDMA is arranged to replace the old CDMA and TDMA based systems. Each eNOdeB in the cellular network controls a cell in which the user equipment is positioned. When the user equipment moves from one cell to an adjacent cell a handover has to be performed where the communication path is directed from the previous NodeB (hereinafter referred to as source eNodeB) and the eNodeB (hereinafter referred to as target eNodeB) controlling the adjacent cell.

The MME share similarities with control plane of the Serving General Packet Radio Service (hereinafter called GPRS) Support Node (hereinafter called SGSN) in the current release of the 3GPP core network. The UPE terminates the RAN interface and is in that respect similar to the previously used Gateway Support Node (hereinafter called GGSN) when direct tunnel between the RNC and the GGSN is used. The System Architecture Evolution Gateway (SAE GW) is a node that will contain the main features of the GGSN in current release of the 3GPP network.

One effect of the changed architecture of the Radio Access Network (hereinafter called RAN) is that there will be substantially more radio access nodes, i.e. eNodeBs communicating directly with the core network nodes MME and UPE. This effect is further enhanced when pooling of CN nodes (similar to Iu-flex in the legacy 3GPP standard) is applied because an even larger number of eNodeBs will communicate with each MME and UPE.

The cells of LTE radio are expected to be smaller than in legacy 3GPP radio and a moving UE is likely to cause a higher frequency of cell changes. The smaller cells also cause a shorter timing window for a signalling procedure to complete when dealing with a moving UE. The most basic procedure that needs to be functional at these constraints is the intra LTE handover when the UE moves from the control of one eNodeB to the control of another eNodeB.

The increase in the expected number of eNodeBs and the expected reduction of coverage area per eNodeB will result in a substantially larger number of executed handover procedures between eNodeBs as well as between eNodeB and MME and UPE nodes. The hand over procedure therefore need to be efficient to meet requirements of expected characteristics in end-to-end communication between UEs and applications located within or beyond the core network.

There is thus a need for a method and a system that allows for an efficient and fast handover procedure in the above mentioned system.

SUMMARY

The object of the invention is to find a method and a system for a fast, efficient and reliable handover procedure for a data packet based cellular wireless mobile communications network. The communication network comprises a core network, CN, and a radio area network, RAN. The core network, CN, comprises a control plane node, MME, intercommunicating with a user plane node, UPE. The radio area network comprises a mobile user equipment, UE, intercommunicating with an expanded source radio base transceiver station, source eNodeB. Payload data between the user equipment UE and the core network, CN, in the form of uplink, UL, data and downlink, DL, data is routed via a tunnel between the user plane node, UPE, and the source eNodeB.

The handover comprises the step of establishing a temporary tunnel between the user plane node, UPE, and a target eNodeB. The handover is initiated by the target eNodeB transmitting unreliable uplink data signal to the UPE comprising information that a handover is about to take place and that the tunnel shall be moved from the source eNOdeB to the target eNodeB.

Here "tunnel" refers to a situation where both uplink and downlink traffic are allowed between two endpoints. In this case the endpoints are the UPE and the eNodeB.

Here "unreliable" refers to a situation where a signal is transmitted from a first unit to a second unit without guaranteeing the delivery of the signal. This can be done by allowing the first unit to transmit a signal without any requirements on the second unit to send an acknowledgement to the first unit upon reception of the signal.

The "handover" refers to the situation where the user equipment changes from one eNOdeB to another eNodeB. This situation is common when the user equipment switches from one cell controlled by the source eNodeB to another cell controlled by the target eNodeB.

In the present invention it is an advantage that the target eNodeB is allowed to transmit the unreliable uplink data signal to the UPE since the unreliable signal is fast compared to a reliable signal because the signalling can be done direct to the payload node, i.e. to the user pane node UPE without going through the path via the more slow control plane node MME. The latter being a signal that has to be acknowledged before the information in the signal being executed. Hence, the unreliable uplink data signal is a fast way to establish the temporary tunnel and therefore preparing for the handover because an extra control plane to the payload node, i.e. the user plane node UPE, can be avoided.

It should be noted that the target eNodeB is allowed to transmit unreliable uplink data to the UPE at the same time as the source eNodeB maintains the tunnel between the UPE and itself. One advantage of keeping the existing tunnel intact during the establishment of the temporary tunnel is that it is easy and resource efficient to switch back to the existing tunnel if anything should go wrong when the temporary tunnel is set up.

The UPE establishes the temporary tunnel upon reception of information from the target eNodeB, comprising the address of the target eNodeB. The temporary tunnel is established when the UPE receives the tunnel endpoint information form the eNodeB because at this point in time, both the target eNodeB and the UPE have got the address of its counterpart. It should be noted that transmission of data in the downlink is not required when a tunnel is set up; it is enough if the endpoints on each side of the tunnel knows the address of the endpoint at the other side of the tunnel. However, when the temporary tunnel has been established downlink signals from the UPE to the UE is allowed via the temporary tunnel and the target eNodeB. The temporary tunnel allows for upload and download of payload data packets.

The unreliable uplink data information to the UPE may be in the form of a GPRS Tunneling Protocol (hereinafter called GTP-U) message or information being embedded in an uplink GTP-U data packet head. The unreliable uplink data information to the UPE may comprise reference material regarding existing downlink Tunnel Endpoint IDentifier, TEID, referring to the source eNodeB and information that this TEID shall not be used but that a new downlink TEID identifying the target eNodeB shall be used instead.

In addition to the above unreliable signal, the target eNOdeB transmits a reliable control signal to the control plane node, MME, which in turn forwards the reliable control signal to the user plane node, UPE. The reliable signal comprises information that the UPE shall either establish a tunnel between the UPE and the target eNodeB if no temporary tunnel has been established, or to permanent the temporary tunnel if it has been established. The reliable control signal is advantageously a GPRS Tunneling Protocol (hereinafter called GTP-C) signal or an application protocol in a stream control transmission protocol, SCTP, based two way stream communications system.

One advantage of the reliable signal is that the handover is executed even if the temporary tunnel has not been established. Another advantage is that the control signal permanents and thus secures the temporary tunnel if in existence. In the latter case the temporary tunnel has allowed for a fast and efficient handover, i.e. the possibility for the UE to transmit and receive information to and from the UPE via the target eNodeB, before the slower processing of the acknowledged control signal via the MME has been performed.

The unreliable uplink data information to the user plane node, UPE, is transmitted before or simultaneously with the reliable control signal to the control plane node, MME. Both alternatives gives a fast setup of the temporary tunnel, which setup is faster than awaiting a setup of the tunnel by the controlled signal. Hence, the inventive method gives a fast and efficient handover by allowing for the setup of the temporary tunnel and at the same time a secure handover due to the existence of the control signal.

According to one embodiment of the invention the UPE releases the tunnel between the UPE and the source eNodeB when the tunnel between the UPE and the target eNodeB has been established, i.e. when the control signal has been acknowledged by the MME and forwarded to the UPE.

This embodiment has the advantage that the UPE may switch back from the temporary tunnel to the existing tunnel if anything would go wrong with the temporary tunnel, or if the UPE does not receive the control signal within a selected time period starting when the UPE receives the unreliable signal from the target eNOdeB. The possibility to switch back is efficient and swift and does not consume much system resources.

BRIEF DESCRIPTION OF THE DRAWINGS

The invention will below be explained in further detail with reference to a number of drawings, wherein:

FIG. 3 schematically shows a more detailed sequence diagram for the handover according to the invention, and wherein;

DETAILED DESCRIPTION

Figure 1:
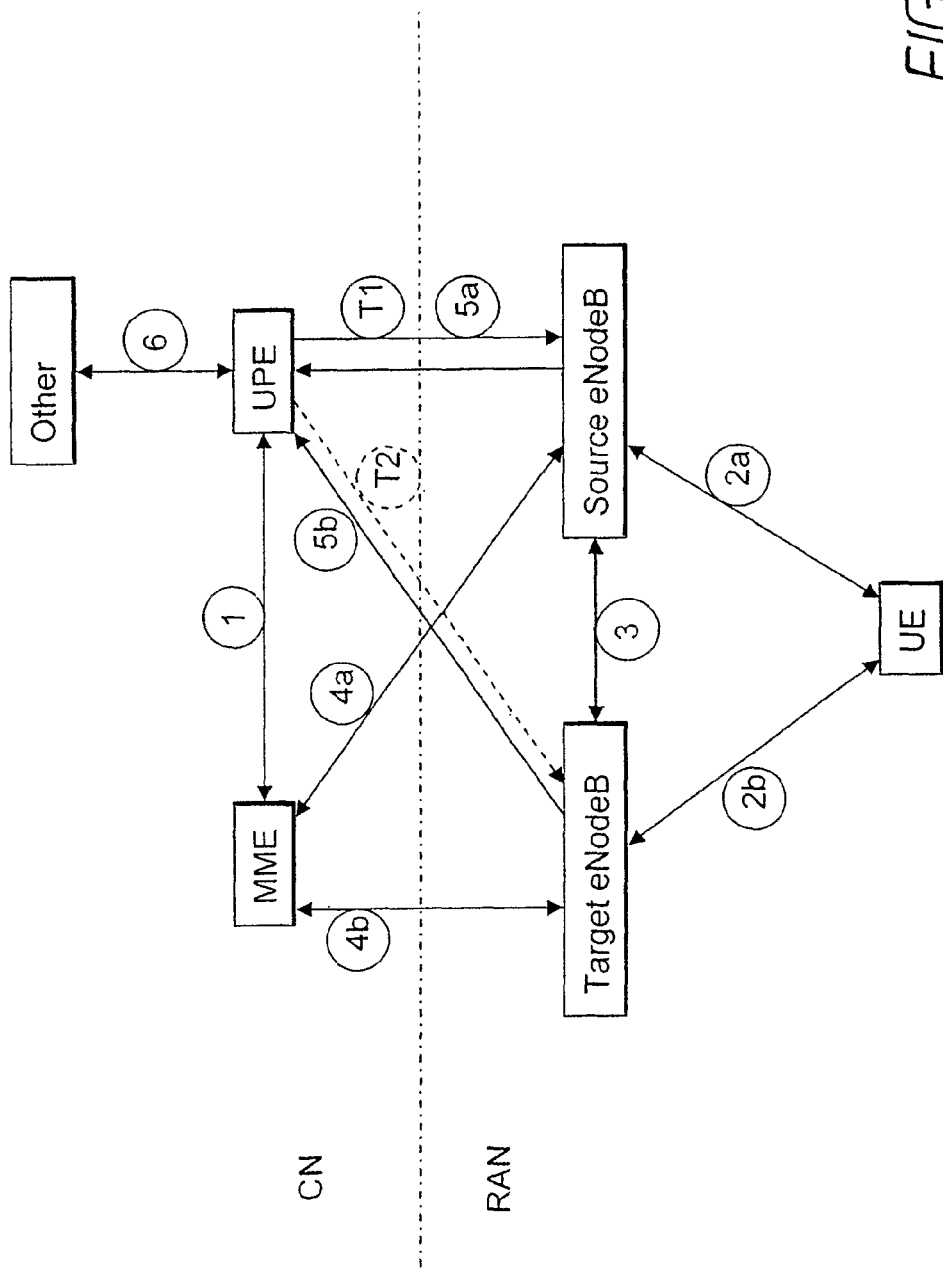
FIG. 1 schematically shows a data packet based wireless mobile communications network comprising a core network and a radio area network according to the invention.

FIG. 1 schematically shows a data packet based wireless mobile communications network. In FIG. 1 communication routes are denoted with numbers within a circle and will in the following text be labelled with the numbers only. The communication network comprises a core network CN and a radio area network RAN. The core network CN comprises a control plane node MME intercommunicating 1 with a user plane node UPE.

The radio area network comprises a mobile user equipment UE intercommunicating 2 with an enhanced source radio base transceiver station source eNodeB. The user equipment may be a cellular telephone or a computer or the like. Payload data between the UE and the core network CN in the form of uplink UL data and downlink DL data is routed via a tunnel T1 between the user plane node UPE and the source eNodeB. Uplink relates to a payload data flow in the direction from the UE to the UPE and downlink relates to a payload data flow in the direction from the UPE to the UE. The tunnel T1 allows for both uplink and downlink communication.

The UE is positioned within a cell (not shown) controlled by the source eNodeB and the communication is routed via the tunnel T1. When the UE migrates into an adjacent cell controlled by a target eNodeB, the tunnel T1 needs to be switched from the source eNodeB to the target eNodeB. This is performed by a so called handover procedure, where the UPE moves the tunnel in the user plane. Before the tunnel T1 is switched, the UPE need information that the tunnel T1 shall be shifted. The mechanism of handing over radio control and radio management of the UE between different eNodeBs is handled by inter eNodeB communication 3. The communication signals 4a, 4b between the source and target eNodeBs respectively and the core network control plane node MME handles mobility management aspects for the UE. The communication signals 5a, 5b between source and target eNodeBs respectively and the core network CN user plane node UPE is used for handling the setup of a temporary tunnel T2 according to below.

The handover according to the invention comprises the step of establishing a temporary tunnel T2 (dotted line in FIG. 1) between the user plane node UPE and a target eNodeB when information has been received at the target eNodeB that a handover is about to take place. Such information can be supplied to the target eNodeB by the source eNodeB or directly by the UE, dependent on, for example, the resources allocated to the different eNodeBs and the UE.

Regardless of how the target eNodeB has been given the handover initiation information, the handover is initiated by the target eNodeB transmitting an unreliable uplink data signal 5b a to the UPE comprising information that a handover is about to take place and that the downlink tunnel endpoint of tunnel T1 shall be moved from the source eNOdeB to the target eNodeB. It should be noted that the communication signals 5a between the UPE and the source eNodeB comprises both uplink and downlink traffic because of the already existing tunnel T1. The temporary tunnel allows for uplink 5b and downlink transmission as soon as the UPE has received and logged the unreliable uplink signal information comprising the endpoint information regarding the target eNodeB.

The unreliable uplink signal comprises address information regarding the source eNOdeB and the target eNodeB so that the UPE can identify the source eNode and the target eNodeB. The unreliable uplink data information to the UPE may be in the form of a GTP-U message or information being embedded in an uplink GTP-U data packet head. When setting up the new tunnel T2, the unreliable uplink data information to the UPE may comprise reference material regarding existing Tunnel Endpoint IDentifier, TEID, referring to the source eNodeB and information that this TEID shall not be used but that a new TEID identifying the target eNodeB shall be used instead. This information means that the temporary tunnel shall be permanent or, in case the temporary tunnel has failed, that a new tunnel shall be established.

When the UPE receives the uplink signal 5b, it keeps the existing tunnel T1 open and establishes the temporary tunnel T2 by use of the endpoint information regarding the target eNOdeB comprised in the unreliable uplink data transmission.

In addition to the above unreliable signal 5b, the target eNodeB transmits a reliable control signal 4b to the control plane node, MME, which in turn forwards 1 the reliable control signal to the user plane node, UPE. The reliable signal comprises information that the UPE shall either establish a tunnel between the UPE and the target eNodeB if no temporary tunnel has been established, or to permanent the temporary tunnel if it has been established. The reliable control signal is advantageously a GTP-C signal in a stream control transmission protocol or a SCTP, based two way stream communications system.

The unreliable uplink data information/signal 5b to the user plane node, UPE, is transmitted before or simultaneously with the reliable control signal 4b to the control plane node, MME. The combination of the two gives a fast setup of the tunnel T2, which setup is faster than awaiting a setup of the tunnel T2 by the controlled signal via the MME only. Hence, the inventive method gives a fast and efficient handover by allowing for the setup of the tunnel T2 and at the same time a secure handover due to the existence of the control signal 4b.

The fast path switching in the user plane provides a simple yet effective handover by not involving using acknowledgement signalling, while the authenticity and reliability of the procedure instead is guaranteed by the MME.

According to one embodiment of the invention, the user plane node UPE comprises a timer (not shown) starting when the user plane node UPE has received the unreliable uplink data information from the target eNodeB. The user plane node UPE uses the timer starting time for calculating a time out period under which the reliable control signal 1 should be received by the user plane node UPE. If the reliable control signal is not received within the time period the temporary tunnel is withdrawn and the already existing tunnel between the user node plane UPE and the source eNOdeB is re-established.

One advantage of the invention is that the tunnel T1 between the user plane node UPE and the source eNodeB is open for uplink and downlink data packet transmissions until the user plane node releases the tunnel, so that the user plane node UPE can re-route the user equipment UE transmission path to the already existing tunnel T1 should the temporary tunnel T2 be faulty or if a radio access parameter with the user equipment UE is transmitted to the user plane node UPE giving information that a switch from target eNodeB to source eNodeB is unsuitable.

In FIG. 1 is shown that the user plane node UPE communicates 6 with other units, via a SAE GW, within the core network. The other units may be a computer server or another node transmitting and receiving information in another wireless network.

Figure 2:
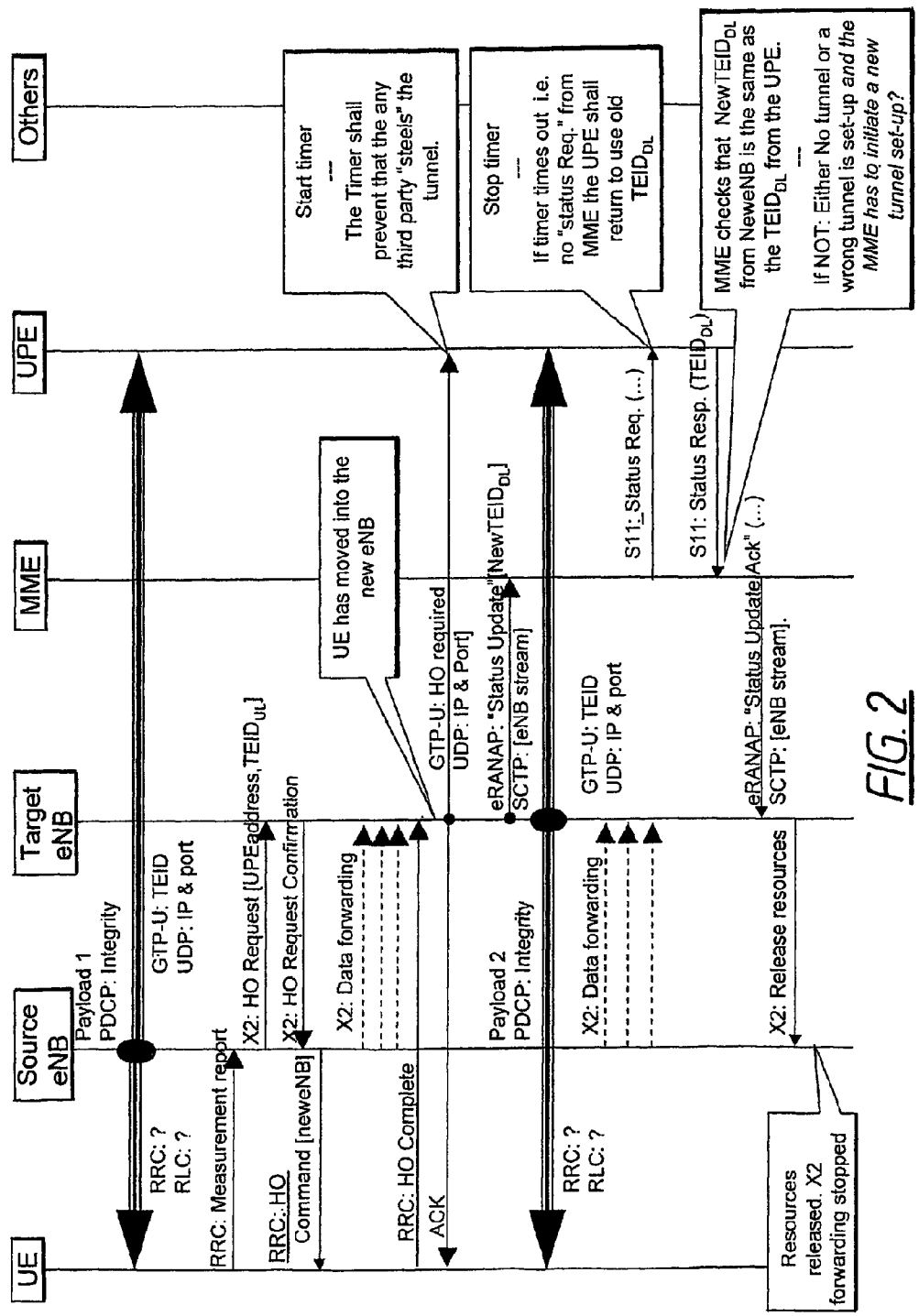
FIG. 2 schematically shows a sequence diagram for the handover according to the invention.

FIG. 2 schematically shows a sequence diagram for the handover according to the invention.

The signalling delay from the interaction with MME/UPE may cause a problem when the time of the delay is comparable in size with the time of UE presence in a cell handled by source eNodeB until the UE moves to a cell handled by target eNodeB.

The discussed timing problem is solved with the present invention by combining fast in-band-path-switching in the user plane in combination with an authenticated and reliable signalling in the control plane.

The interface between the source eNodeB and the target eNodeB is by 3GPP named X2 and the interface between eNodeB and the combination of MME and UPE is named S1. The interface between eNodeB and MME is by this text named S1_C, and the interface between eNodeB and UPE is named S1_U. S1_C is intended for control signaling and the S1_U is intended for user payload transport.

The selected transport communication protocol at the S1_C interface is Stream Control Transmission Protocol (hereinafter called SCTP), while the GPRS Tunneling Protocol-U (hereinafter called GTP-U) over the User Datagram Protocol (hereinafter called UDP) is selected for S1_U. GTP-U is used for carrying user data within the GPRS core network and between the Radio Access Network and the core network The payload related to a specific UE is differentiated from payload from other UEs by the GTP-U Tunnel Endpoint Identifier (hereinafter called TEID), one in uplink direction and one in downlink direction.

The control signaling related to information exchange between the functional entity UPE and the functional entity MME is expected to be handled by one pair of SCTP streams in the S11 interface.

The application layer protocol between the eNodeB and MME is expected to an evolution of the RANAP protocol (3GPP TS 25.413), here named eRANAP.

The control signaling related to a specific UE is differentiated from signaling related to other UEs by an application layer identifier, eRANAP_UE_ID, as part of an application protocol unit carried in the SCTP association or the Payload Protocol Identifier PPI field of SCTP.

The invention applies a combination of a fast unreliable hand over and an authorized and authenticated hand over of the UE between the source and the target eNodeBs.

The fast unreliable hand over provides characteristics that meet the need of uninterrupted communication.

The immediately following authorized and authenticated hand over adds the characteristics required by service provisioning as well as a security measure.

The outline of the procedure is as follows:

Precondition:

The UE is in state LTE_ACTIVE and handled by eNodeB_1, MME_1 and UPE_1. The UE is moving into coverage of eNodeB_2.

1. The RAN nodes eNodeB_1 and eNodeB_2 negotiates and prepares for a hand over of UE. Information is exchanged using the X2 interface between eNodeB_1 and eNodeB_2.
2. eNodeB_2 acquires control of UE. At this moment the eNodeB_2 send a GTP-U packet with information about that the new downlink endpoint related to UE is located at eNodeB_2. The information sent is previous downlink TEID (provided to eNodeB_2 by eNodeB_1 over X2) and the new downlink TEID in eNodeB_2.

The information is provided as an extension header as either an ordinary uplink GTP-U PDU or as an extension header of a GTP-U Echo Response message. By using the received information, the UPE can immediately use the new GTP-U endpoint for downlink payload traffic.

Figure 3:
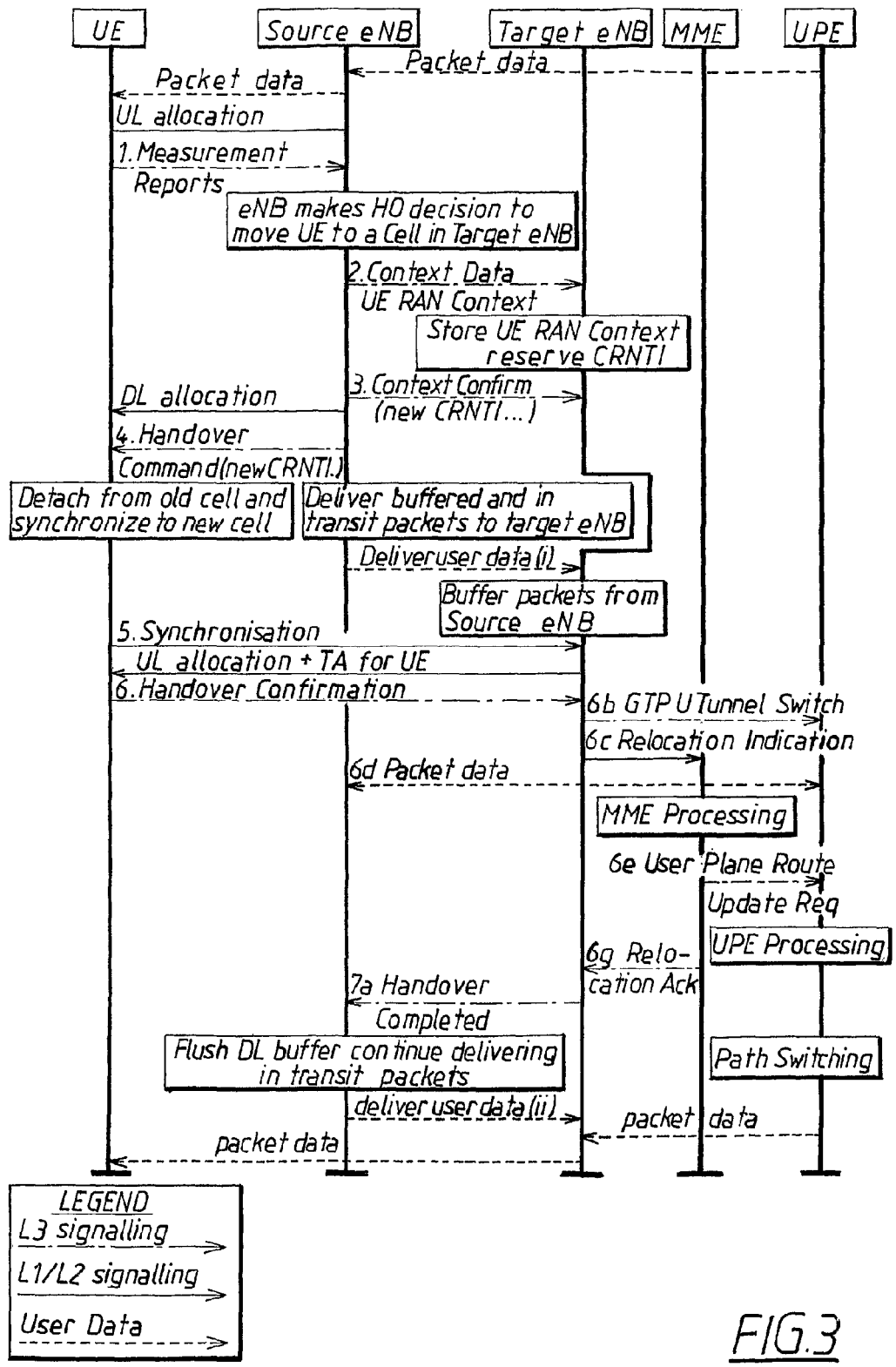

3. At the same time (when eNodeB_2 acquires control of UE), the eNodeB_2 sends an eRANAP message using the uplink eNodeB_stream containing the eRANAP_UE_ID that was used by eNodeB_1 and the new eRANAP_UE_ID that is used by eNodeB_2. By using the new information, the MME is able to replace the RAN control signaling transport reference for the UE and immediately use the reference for downlink NAS signaling.
4. The MME verifies (authenticate and authorise) the new location of the UE and, if accepted, send the UPE a message confirming that the hand over made in step 2 is accepted.
5. The UPE confirms the message.
6. The MME confirms the hand over to eNodeB_2.
7. The eNodeB_2 informs eNodeB_1 that the radio resources reserved for UE is no longer needed.
8. The hand over is concluded FIG. 3 schematically shows a more detailed sequence diagram for the handover according to the invention. FIG. 3 shows the following steps:

1. UE is triggered to send MEASUREMENT REPORT by the rules set by e.g. system information, specification etc.
2. Source eNodeB makes decision based on MEASUREMENT REPORT and Radio Resource Management RRM information to hand off UE. The source eNodeB prepares target eNodeB for handover and passes relevant information in the Handover Request. Relevant information includes the Quality of Service QoS profiles of the SAE bearers and possibly the AS configurations of these bearers (FFS). The information that is handed over includes the MME specific S1 UE Context Identity. The information also includes the GTP-U IP address and TEID for each of the IP bearer services used by UE.
3. Target eNodeB prepares HO with L1/L2 and responds to source eNodeB by providing new C-RNTI and possibly some other parameters i.e. access parameters, SIBs, etc. After reception of accepted preparation of HO, source eNodeB starts forwarding data packets to target eNodeB.
4. UE receives HANDOVER COMMAND with necessary parameters i.e. new C-RNTI, possible starting time, target eNodeB SIBs etc. It is probable that UE needs to acknowledge reception of the HO COMMAND with RLC acknowledgment procedure.
5. After expiry of starting time in HO COMMAND, UE performs synchronisation to target eNodeB and then starts acquiring UL timing advance.
6. Network responds with UL allocation and timing advance. These are used by UE to send HANDOVER CONFIRM to the target eNodeB, which completes handover procedure for the UE. It is probable that NW needs to acknowledge reception of the HO CONFIRM with RLC acknowledgment procedure.

6b. The target eNodeB sends a GTP-U PDU to UPE with information about current GTP-U tunnel endpoint at source eNodeB and the new GTP-U tunnel endpoint at target eNodeB.

6c. The target eNodeB sends a Relocation Indication message to MME.

6d. The UPE change GTP-U tunnel downlink DL endpoint (IP address and TEID) to target eNodeB. UPE starts a timer to supervise the unconfirmed switch of downlink DL tunnel endpoint and starts to send downlink data packets to the new endpoint at target eNodeB. UPE may accept uplink data packets from both source eNodeB and target eNodeB.

6e. MME sends a User Plane Route Update Request to UPE. The request instructs UPE of which IP bearer services to use for UE and confirms the GTP-U tunnel switch. UPE stops the supervision timer.

6f. MME sends a Relocation Ack to target eNodeB.

7a. Target eNodeB informs success of HO to source eNodeB, which can then clear already forwarded data from its buffers.

Figure 4:
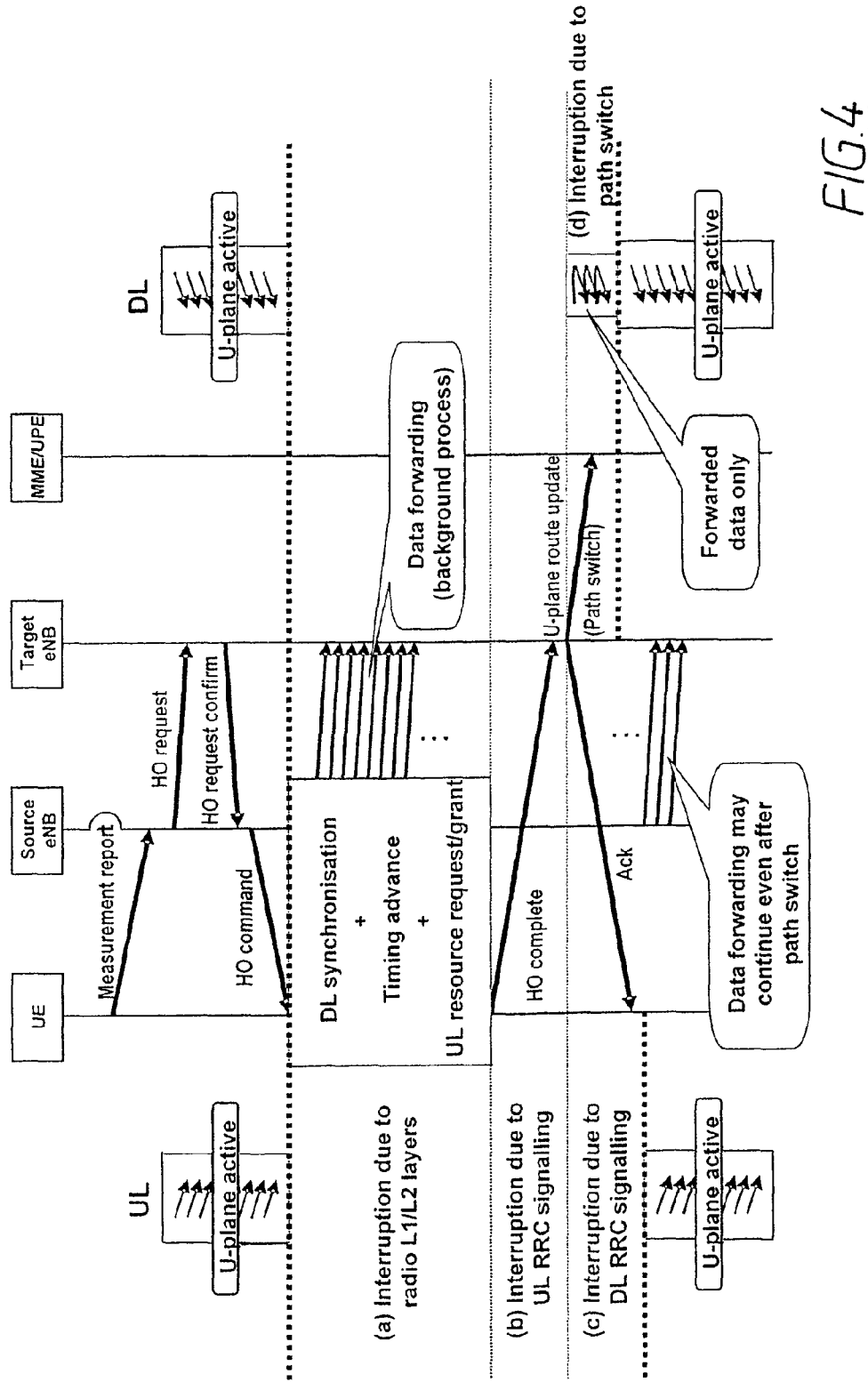
FIG. 4 schematically shows a sequence diagram for the UE during the handover according to the invention.

FIG. 4 schematically shows a sequence diagram for the RAN during the handover according to the invention. The sequence comprises the following steps:

1. The handover start with the UE sending a measurement report regrading cells and a signal strength to the source eNOdeB.
2. Source eNodeB compares information and makes a decision that the UE is better handled by the target eNodeB. Source eNodeB therefore sends an handover request to target eNodeB.
3. Target eNodeB checks a number of parameters, for example if the cell is blocked, and then sends a handover request confirmation to source eNodeB.
4. Source eNodeB sends a handover command till UE. According to FIG. 4, uplink payload is allowed from the UE by source eNodeB forwarding data to target eNodeB.
5. The UE deals with its radio close handling, for example, DL synch, timing advance, UL resource allocation etc., for moving its communication from the source eNodeB to the target source eNOdeB.
6. When the UE is finished with 5 the UE sends a handover complete to the target eNodeB to which the UE now has moved.
7. Target eNodeB performs a user plane switch.

8. Target eNodeB sends an acknowledge signal to the UE and according to FIG. 4 the user plane of the UE is thereafter operational.

The present invention allows uplink data from both source eNodeB and target eNodeB during the handover session until the temporary tunnel has been become permanent. This is possible since the uplink data being sent from both the source and target eNodeB comprise GTP-U heads comprising re-routing information that makes the UPE accept the uplink data packets. The switching information The re-routing information in the GTP-U is used for giving information on whether the target and/or source eNodeB can handle downlink data packet, i.e. if the eNodeB in question has a functioning radio transport for downlink to the UE.

Another advantage is that the uplink and downlink handling in the respective eNOdeB does not need to be synchronised in time.

Since the existing tunnel (T1 in FIG. 1) is still open during the handover, the system allows for a simple fall back scenario should the temporary tunnel (T2 in FIG. 2) fail according to the following steps:

1. The UE has moved from the source eNodeB to the target eNodeB, because the target eNodeB has transmitted the unreliable uplink data signal to the user plane node UPE requesting a handover and has received information from the UPE that a temporary tunnel is set up, i.e. that downlink information is allowed.
2. A user plane switch is made by the target eNodeB towards the UPE, but the temporary tunnel fails due to a time out in the UPE. The time out becomes active when the target NodeB has not sent the reliable control signal to the UPE via the MME.
3. The UE then moves back to source eNodeB before the target eNodeB sends Relocation Indication to the MME, i.e. before the control signal for handover is transmitted from the target eNodeB to the control plane node MME.
4. A User plane switch towards the UPE is then made by the source eNodeB allowing data transmission in the still existing tunnel between the UPE and the source eNodeB. The switch back to the existing tunnel can be done since the user plane node UPE keeps information previously sent from the control plane node MME until the MME instructs the UPE to drop the old information and to use the new information brought forward by the MME. The latter is done when the reliable control signal has reached the UPE via the MME, which gives that if no such signal has been sent there is no need for a complementary control signal between the source eNOdeB and the control plane node MME since that information is already at the UPE. Hence, in the case where no reliable control signal has been sent, the method allows for a fast and simple re-establishment of the already tunnel during the critical phase of the handover.

Some advantages of the invention:

The invention allows for both a fast and reliable handover of UE between eNodeBs.

The hand over is transparent to NAS procedures, i.e. there is neither a need for forwarding NAS messages between eNodeBs nor replying a negative acknowledge back to MME when a NAS message could not be delivered.

The simple solution allows for robustness in an implementation.

The inventive method lowers the impact of denial-of-service attacks at the S1_U interface in case its protocol stack is implemented without integrity protection at the PDCP layer.

The invention claimed is:

1. A handover method for a data packet based wireless mobile communications network, wherein the network comprises a core network and a radio area network, the core network comprising a control plane node intercommunicating with a user plane node, the radio area network comprising a mobile user equipment intercommunicating with a source radio base transceiver station (eNodeB), wherein payload data between the user equipment and the core network in the form of uplink data and downlink data is routed via a tunnel between the user plane node and the source eNodeB, said method comprising:
   establishing a temporary tunnel between the user plane node and a target eNodeB, the handover being initiated by the target eNodeB transmitting unreliable uplink data signal to the user plane node comprising the information that a handover is about to take place and that the tunnel shall be moved from the source eNodeB to the target eNodeB;
      wherein the unreliable uplink data information to the user plane node is a GTP-U message or information being embedded in an uplink GTP-U data packet header;
      wherein the unreliable uplink data information to the user plane node comprises reference material regarding existing TEID referring to the source eNodeB and information that this TEID shall not be used but that new TEID identifying the target eNodeB shall be used instead; and,
   transmitting, by the target eNodeB, a reliable control signal to the control plane node which in turn forwards the reliable control signal to the user plane node, wherein the reliable signal comprises information that the user plane node shall establish a tunnel between the user plane node and the target eNodeB if no temporary tunnel has been established or to make permanent the temporary tunnel if it has been established.

2. The handover method according to claim 1, wherein the user plane node establishes the temporary tunnel upon reception of information from the target eNodeB comprising the user plane IP address and Tunnel Endpoint Identifier (TEID) of the target eNodeB by receiving uplink data to the target eNodeB, thereby allowing downlink payload data packets from the user plane node to the user equipment UE via the temporary tunnel and the target eNodeB.

3. The handover method according to claim 1, wherein the user plane node releases the tunnel between the user plane node and the source eNodeB when the tunnel between the user plane node and the target eNodeB has been established.

4. The handover method according to claim 1, wherein the tunnel between the user plane node and the source eNodeB is open for uplink and downlink data packet transmissions until the user plane node releases the tunnel, so that the user plane node can re-route the user equipment transmission path to the tunnel should the temporary tunnel be faulty or if a radio access parameter with the user equipment is transmitted to the user plane node giving information that a switch from target eNodeB to source eNodeB is unsuitable.

5. The handover method according to claim 1, wherein the user plane node comprises a timer starting when the user plane node has received the unreliable uplink data information from the target eNodeB, wherein user plane node uses the timer starting time for calculating a time out period under which the reliable control signal should be received by the user plane node and if the reliable control signal is not received within the time period the temporary tunnel is withdrawn and the already existing tunnel between the user node plane and the source eNOdeB is preserved.

6. The handover method according to claim 1, wherein the reliable control signal is either a GTP-C signal or an application protocol signal in a stream control transmission protocol based two way stream communications.

7. The handover method according to claim 1, wherein the unreliable uplink data information to the user plane node is transmitted before or simultaneous to the reliable control signal sent to the control plane node.

* * * * *

UNITED STATES PATENT AND TRADEMARK OFFICE
CERTIFICATE OF CORRECTION

| | | |
|---|---|---|
| PATENT NO. | : 8,259,677 B2 | Page 1 of 1 |
| APPLICATION NO. | : 12/525706 | |
| DATED | : September 4, 2012 | |
| INVENTOR(S) | : Olsson et al. | |

It is certified that error appears in the above-identified patent and that said Letters Patent is hereby corrected as shown below:

In Column 3, Line 33, delete "form" and insert -- from --, therefor.

In Column 7, Line 57, delete "concluded" and insert -- concluded. --, therefor.

In Column 8, Line 48, delete "regrading" and insert -- regarding --, therefor.

In Column 9, Line 10, delete "information" and insert -- information. --, therefor.

Signed and Sealed this
First Day of January, 2013

David J. Kappos
*Director of the United States Patent and Trademark Office*